US010620664B2

United States Patent
Yang et al.

(10) Patent No.: US 10,620,664 B2
(45) Date of Patent: Apr. 14, 2020

(54) FOLDABLE DISPLAY PANNEL, DISPLAY DEVICE, IMAGE COMPENSATION METHOD AND IMAGE COMPENSATION DEVICE

(71) Applicant: SHANGHAI TIANMA AM-OLED CO., LTD., Shanghai (CN)

(72) Inventors: Yang Yang, Shanghai (CN); Bojia Lv, Shanghai (CN); Xiangzi Kong, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 16/224,829

(22) Filed: Dec. 19, 2018

(65) Prior Publication Data

US 2019/0121390 A1 Apr. 25, 2019

(30) Foreign Application Priority Data

May 30, 2018 (CN) .......................... 2018 1 0538307

(51) Int. Cl.
  *G06F 1/16* (2006.01)
  *G09G 3/3233* (2016.01)
  *G09G 3/3208* (2016.01)

(52) U.S. Cl.
  CPC ......... *G06F 1/1616* (2013.01); *G09G 3/3208* (2013.01); *G09G 3/3233* (2013.01);
  (Continued)

(58) Field of Classification Search
  CPC ................ G06F 1/1616; G09G 3/3233; G09G 2300/0439; G09G 2320/0233; G09G 2320/0261; G09G 2320/08
  (Continued)

(56) References Cited

U.S. PATENT DOCUMENTS 9,001,010 B2   4/2015 Jeon
2011/0102390 A1* 5/2011 Moriwaki ............ G09G 3/3208
                                                            345/207
(Continued)

FOREIGN PATENT DOCUMENTS

CN    105676965 A  * 6/2016  ........... G06F 1/1641
CN    107316605 A    11/2017

OTHER PUBLICATIONS

Blankenbach K. (2016) Standards and Test Patterns. In: Chen J., Cranton W., Fihn M. (eds) Handbook of Visual Display Technology. Springer, Cham Oct. 25, 2016, retrieved from web on Oct. 12, 2019 from https://link.springer.com/referenceworkentry/10.1007%2F978-3-319-14346-0_150 (Year: 2016).*

*Primary Examiner* — Mark Edwards
(74) *Attorney, Agent, or Firm* — Kilpatrick Townsend & Stockton, LLP

(57) ABSTRACT

A foldable display panel, a display device, an image compensation method and an image compensation device are provided. The foldable display panel includes a first display panel and a second display panel which are foldable toward each other along a joining edge, and each of sub-pixels on the two display panels has an optical information detecting function. In a case that the first display panel and the second display panel are in a folded state, each of the sub-pixels on one display panel is used for detecting optical information of a corresponding sub-pixel on the other display panel, to perform optical compensation on the sub-pixel. Since optical information detection and image compensation are performed in a case that the foldable display panel is in the folded state, the use of the foldable display panel is not affected.

19 Claims, 13 Drawing Sheets

(52) U.S. Cl.
CPC .............. *G09G 2300/0439* (2013.01); *G09G 2320/0233* (2013.01); *G09G 2320/0261* (2013.01); *G09G 2320/0693* (2013.01); *G09G 2320/08* (2013.01); *G09G 2360/148* (2013.01); *G09G 2380/02* (2013.01)

(58) Field of Classification Search
USPC .......................................................... 345/108
See application file for complete search history.

(56) References Cited

U.S. PATENT DOCUMENTS

| | | | |
|---|---|---|---|
| 2015/0221065 A1* | 8/2015 | Kim .................... | G06T 3/40 345/660 |
| 2015/0338888 A1* | 11/2015 | Kim .................... | G06F 1/1677 345/156 |
| 2017/0140737 A1* | 5/2017 | Cho .................... | G06F 1/1652 |
| 2017/0200411 A1* | 7/2017 | Song .................. | G09G 3/3225 |
| 2017/0285837 A1* | 10/2017 | Zeng .................. | G06F 1/1641 |
| 2017/0309226 A1* | 10/2017 | In ....................... | G09G 3/20 |
| 2017/0365224 A1* | 12/2017 | Okamoto .............. | G02F 1/13 |

* cited by examiner

-- Prior Art --

-- Prior Art --

FOLDABLE DISPLAY PANNEL, DISPLAY DEVICE, IMAGE COMPENSATION METHOD AND IMAGE COMPENSATION DEVICE

This application claims the priority to Chinese Patent Application No. 201810538307.5, titled "FOLDABLE DISPLAY PANNEL, DISPLAY DEVICE, IMAGE COMPENSATION METHOD AND IMAGE COMPENSATION DEVICE", filed on May 30, 2018 with the State Intellectual Property Office of People's Republic of China, which is incorporated herein by reference in its entirety.

FIELD

The present disclosure relates to the field of display technologies, and in particular to a foldable display panel, a display device, an image compensation method and an image compensation device.

BACKGROUND

An organic light emitting display device displays an image using organic light emitting diodes (OLEDs). With a soft OLED, flexible display devices such as a rollable display panel and a foldable display panel can be produced. However, during use of an OLED display panel, due to non-uniformity of parameters such as threshold voltages and mobility of driving thin film transistors (TFTs) in the OLED display panel, currents and brightness vary among different OLED display devices, resulting in spots. In addition, the drift of the threshold voltage of the TFT and the degradation of the OLED can also result in a difference in brightness of the pixels involved in a screen displayed on the OLED display panel, thereby resulting in a residual image.

In the conventional technology, the spots or the residual image are eliminated by performing image display compensation, which includes internal compensation and external compensation. According to the internal compensation, a sub-circuit is constructed among TFTs of pixels. This technology has advantages such as a low cost and easy implementation, but also has disadvantages such as a small compensation range, a poor compensation effect, and increased process difficulty. The external compensation includes an optical compensation method and an electrical compensation method, both of which utilize an external drive circuit or device to sense an optical characteristic or electrical characteristic of a pixel to perform compensation. The optical compensation method is advantageous in simple implementation, high flexibility and an improved resolution. The electrical compensation method can be performed in a real-time manner, and has a wide compensation range and an improved resolution. However, the optical compensation method can only be performed for a limited number of times, and involves a large amount of data, thus an additional storage space is required. The electrical compensation method is complex. Both methods result in a complex design of a control chip of the display panel.

A structure corresponding to an optical compensation method commonly used in the conventional technology is as shown in FIG. 1, a flowchart of the optical compensation method is as shown in FIG. 2, and description is made in conjunction with the structure shown in FIG. 1 and the flowchart shown in FIG. 2. In one embodiment, in the conventional technology, compensation is performed on a display panel after the display panel is produced and before the display panel leaves the factory. A compensation method includes the following steps S101 to S106.

In step S101, an OLED display panel 01 displays a test screen.

In step S102, original data on the display panel 01 is acquired by aligning a CCD 02 and focusing a lens.

In step S103, the CCD 02 transmits the acquired original data to a computer 03.

In step S104, the computer 03 processes the original data.

In step S105, the computer 03 generates compensation data based on the original data.

In step S106, the compensation data is written into a flash memory 04 of the display device.

Each time when the display panel is to display a new screen, and the control chip is powered on, the compensation data in the flash memory is loaded into a static memory inside the control chip, and the control chip invokes the compensation data in the static memory to perform compensation on the pixels on the display panel, and transmits compensated display data to the display panel for display.

Since the compensation data is written and is fixed before the display panel leaves the factory, the compensation data is no longer suitable for problems of the residual image or color shift caused by a change of a state of the display panel due to continuous use of the display panel after the display panel leaves the factory. Therefore, the compensation effect is poor and the compensation cannot be performed in real time.

In addition, since a large amount of compensation data which is proportional to the resolution is involved, an additional storage space is required, thereby resulting in increased space, time, and cost.

Therefore, an issue to be solved is to provide a method for performing compensation on a display panel image in a real-time manner with reduced amount of compensation data in subsequent use.

SUMMARY

In view of the above, a foldable display panel, a foldable display device, an image compensation method and an image compensation device are provided according to the present disclosure, to solve the problem in the conventional technology that an image displayed by a display panel cannot be compensated in a real-time manner.

The following technical solutions are provided according to the present disclosure.

A foldable display panel is provided, which includes a first display panel, a second display panel and a folded state detecting device. The first display panel and the second display panel are joined at a joining edge, and one of the first display panel and the second display panel is foldable toward the other one along the joining edge. The folded state detecting device is located on at least one of the first display panel and the second display panel.

The first display panel and the second display panel each include multiple sub-pixels arranged in a matrix, and each of the sub-pixels has a display function and an optical information detecting function. The sub-pixels on the first display panel are symmetrical to the sub-pixels on the second display panel with respect to the joining edge.

In a case of the folded state detecting device detecting that the first display panel and the second display panel are in a folded state, a display side of the first display panel is located facing a display side of the second display panel, and one of a sub-pixel on the first display panel and a sub-pixel on the second display panel arranged opposite to each other is used for detecting optical information of the other one.

In a case where the folded state detecting device detects that the first display panel and the second display panel are in a non-folded state, the sub-pixels on the first display panel and the sub-pixels on the second display panel are all used for displaying.

A foldable display device is further provided according to the present disclosure, which includes the foldable display panel described above.

An image compensation method for a foldable display panel is further provided according to the present disclosure. The image compensation method is performed based on the foldable display panel described above and includes: controlling one of a sub-pixel on the first display panel and a sub-pixel on the second display panel arranged opposite to each other to detect optical information of the other one, in a case that the first display panel and the second display panel are in the folded state; storing the optical information and generating compensation data based on the optical information; performing an operation on the compensation data and original image data to generate compensated image data; and displaying a compensated image based on the compensated image data.

In addition, an image compensation device for a foldable display panel is further provided according to the present disclosure, which is configured to perform the above image compensation method for a foldable display panel. The image compensation device for a foldable display panel includes a folded state detecting device, an optical sensing control device, an optical information storing and processing device, an image processing device, an image compensating device and a display control device.

The folded state detecting device is configured to detect whether the foldable display panel is in the folded state.

The optical sensing control device is configured to control a sub-pixel to detect optical information in a case that the first display panel and the second display panel are in the folded state.

The optical information storing and processing device is configured to store the optical information and generate compensation data based on the optical information.

The image processing device is configured to acquire original image data.

The image compensating device is configured to perform an operation on the compensation data and the original image data to generate compensated image data.

The display control device is configured to display a compensated image based on the compensated image data.

It can be seen from the above technical solutions that, the foldable display panel according to the present disclosure includes a first display panel and a second display panel. One of the first display panel and the second display panel is foldable toward the other one along a joining edge. Each of sub-pixels on the two display panels has an optical information detecting function. In a case that the folded state detecting device detects that the first display panel and the second display panel are in a folded state, each of the sub-pixels on one display panel detects optical information of a corresponding sub-pixel on the other display panel, to obtain optical information of the sub-pixel, so as to perform optical compensation on the sub-pixel. Since optical information detection and image compensation are performed in a case that the foldable display panel according to the present disclosure is in the folded state, the use of the display panel is not affected. In addition, the optical image compensation may be performed for multiple times during the use of the foldable display panel according to the present disclosure after the foldable display panel leaves the factory, and the optical image compensation is performed in real-time manner, such that the quality of a screen displayed on the foldable display panel can be ensured. Since the optical image compensation may be performed for multiple times, and the image compensation may be performed on some of the sub-pixels on the display panel in different time periods, the amount of compensation data can be reduced, thus reducing the amount of data to be processed and prolonging a service life of hardware in the display panel.

A foldable display device is further provided according to the present disclosure, which includes the foldable display panel described above. With the foldable display device, the optical compensation may be performed on an image in a real-time manner, such that the quality of the screen displayed on the foldable display device is improved.

An image compensation method is further provided according to the present disclosure based on the above foldable display panel. According to the image compensation method, in a case that the first display panel and the second display panel are in a folded state, each of the sub-pixels on one display panel is used for detecting optical information of a corresponding sub-pixel on the other display panel, compensation data is generated based on the obtained optical information, then image compensation is performed on the sub-pixel. Since the image compensation method according to the present disclosure is performed in a case that the foldable display panel is in the folded state, the use of the foldable display panel is not affected.

An image compensation device for a foldable display panel is further provided according to the present disclosure. The image compensation device is configured to perform the image compensation method described above.

BRIEF DESCRIPTION OF THE DRAWINGS

In order to more clearly illustrating technical solutions in embodiments of the present disclosure or in the conventional technology, the drawings used to describe the embodiments or the conventional technology are briefly described hereinafter

DETAILED DESCRIPTION OF EMBODIMENTS

Technical solutions of embodiments of the present disclosure are clearly and completely described hereinafter in conjunction with the drawings of the embodiments of the present disclosure. It is apparent that the embodiments described in the following are only some embodiments of the present disclosure, rather than all embodiments.

A foldable display panel is provided according to an embodiment of the present disclosure, which includes a first display panel, a second display panel and a folded state detecting element. The first display panel and the second display panel are joined at a joining edge, and one of the first display panel and the second display panel is foldable toward the other one along the joining edge. The folded state detecting element is located on the first display panel and/or the second display panel.

The first display panel and the second display panel each includes multiple sub-pixels which are arranged in a matrix, and each of the multiple sub-pixels on the first display panel and the multiple sub-pixels on the second display panel has a display function and an optical information detecting function. The multiple sub-pixels on the first display panel are symmetrical to the multiple sub-pixels on the second display panel with respect to the joining edge.

In a case that the folded state detecting element detects that the first display panel and the second display panel are in a folded state, a display side of the first display panel is arranged facing a display side of the second display panel, and one of a sub-pixel on the first display panel and a sub-pixel on the second display panel which are arranged opposite to each other is used for detecting optical information of the other one.

In a case that the folded state detecting element detects that the first display panel and the second display panel are in a non-folded state, the multiple sub-pixels on the first display panel and the multiple sub-pixels on the second display panel are all used for displaying.

It is to be noted that, in the embodiment, the structure of the sub-pixel having the display function and the optical information detecting function is not limited. The sub-pixel may have a structure including a display region and an optical sensor arranged side by side with the display region, or may have a structure including a pixel layer and an optical sensing layer arranged on or under the pixel layer.

Figure 1:
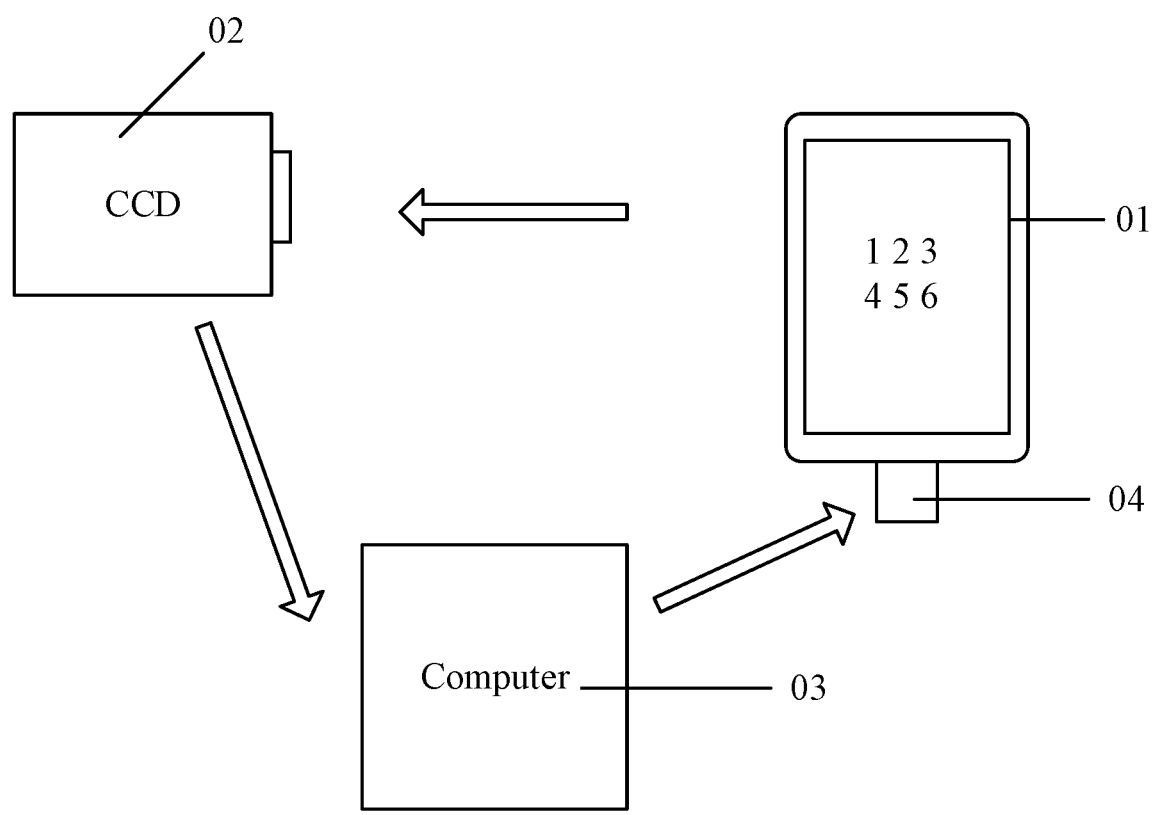
FIG. 1 is a schematic structural diagram of an optical compensation device in the conventional technology.
Figure 2:
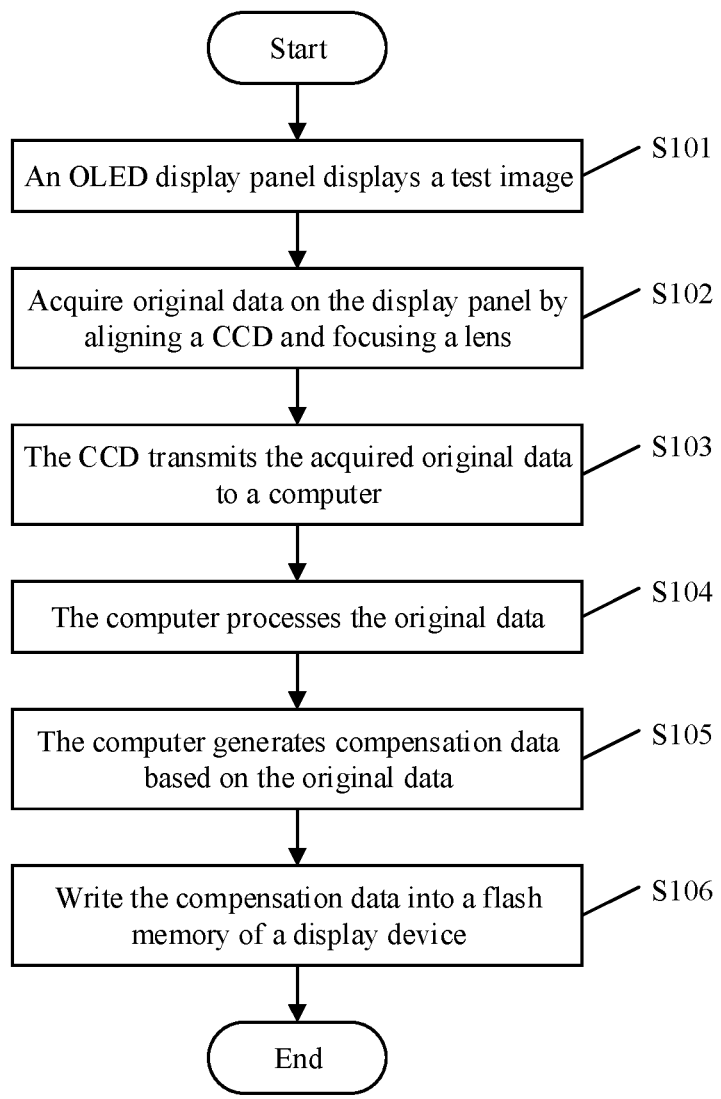
FIG. 2 is a flowchart of an optical compensation method in the conventional technology.
Figure 3:
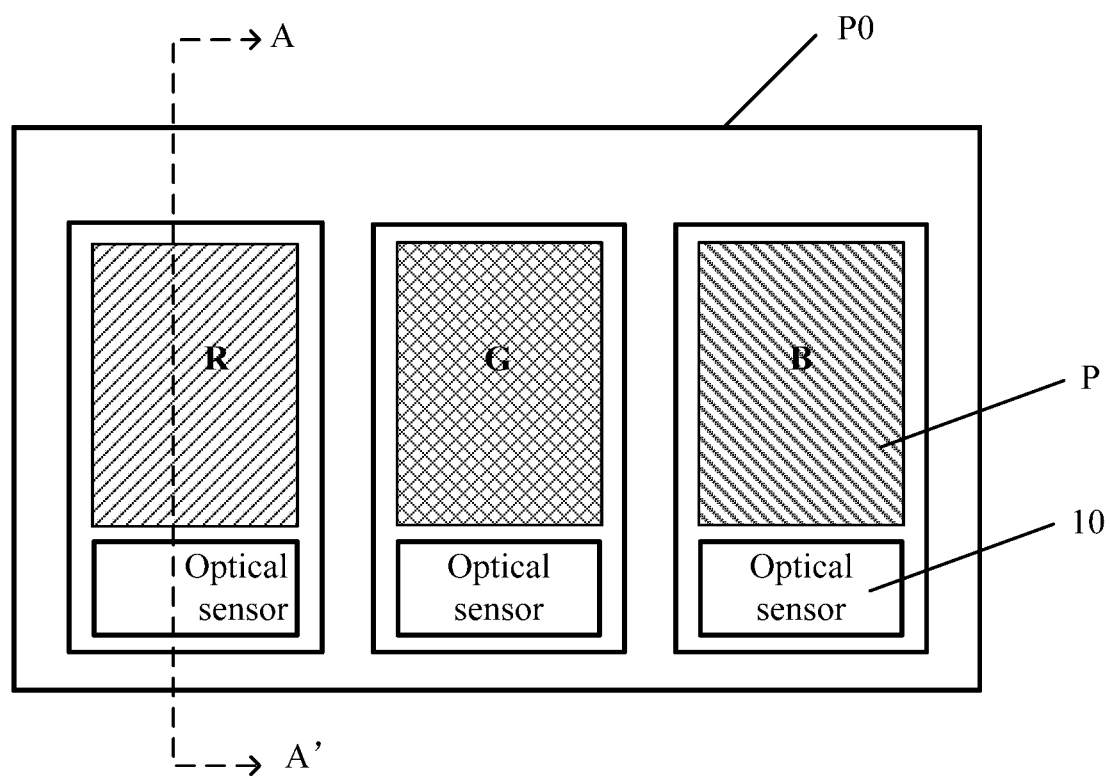
FIG. 3 is a plan view illustrating a structure of a pixel device having a display function and an optical information detecting function according to an embodiment of the present disclosure.
Figure 4:
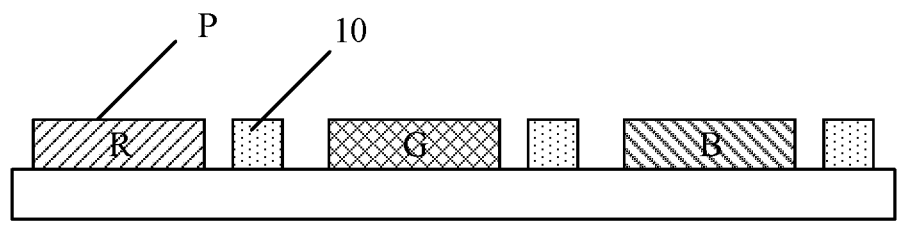
FIG. 4 is a cross-sectional view illustrating a structure of the pixel device shown in FIG. 3 along A-A'.

As shown in FIG. 3 and FIG. 4, FIG. 3 is a plan view illustrating a structure of a pixel device having a display function and an optical information detecting function according to an embodiment of the present disclosure, and FIG. 4 is a cross-sectional view illustrating a structure of the pixel device shown in FIG. 3 along A-A'. A pixel device P0 includes three sub-pixel display regions Ps which include a red sub-pixel display region R, a green sub-pixel display region G and a blue sub-pixel display region B. In addition, each of the sub-pixels further includes an optical sensor 10 arranged side by side with the sub-pixel display region P. That is, in the embodiment, the sub-pixel having the display function and the optical information detecting function includes: a display sub-pixel P and an optical sensor 10 which are arranged side by side in a plane of the first display panel or the second display panel.

It is to be noted that FIG. 3 only shows an example of the embodiment of the present disclosure. In an actual producing process, the optical sensor may also be located at another position relative to the sub-pixel display region, such on a left side or a right side of the sub-pixel display region in FIG. 3, which is not limited in the embodiment.

Figure 5:
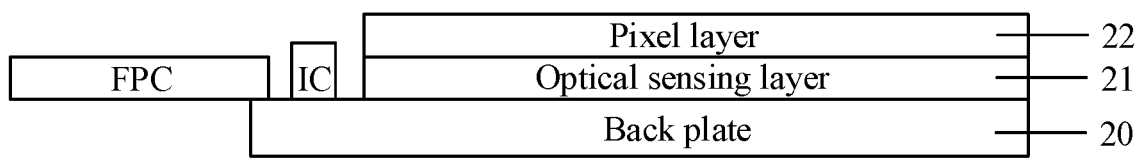
FIG. 5 is a cross-sectional view illustrating a structure of a sub-pixel having a display function and an optical information detecting function according to an embodiment of the present disclosure.
Figure 6:
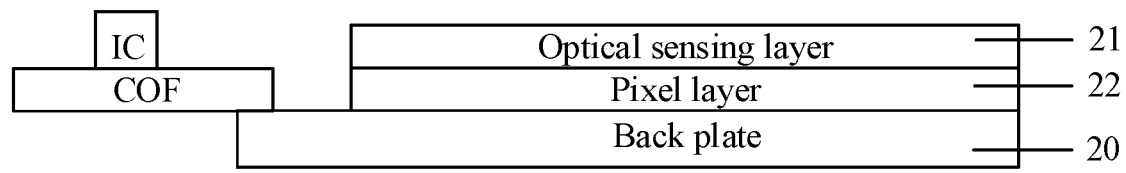
FIG. 6 is a cross-sectional view illustrating a structure of a sub-pixel having a display function and an optical information detecting function according to another embodiment of the present disclosure.

It is to be noted that, in other embodiments of the present disclosure, the sub-pixel having the display function and the optical information detecting function may also have other structures, as shown in FIG. 5, which is a cross-sectional view illustrating a structure of a sub-pixel having a display function and an optical information detecting function according to an embodiment of the present disclosure. In the embodiment, each of the display sub-pixels includes: a back plate 20, and an optical sensing layer 21 and a pixel layer 22 stacked on the back plate 20. The upper and lower relationship between the optical sensing layer 21 and the pixel layer 22 is not limited in the embodiment. The optical sensing layer 21 may be located between the pixel layer 22 and the back plate 20, as shown in FIG. 5. The optical sensing layer 21 may also be located on a surface of the pixel layer 22 facing away from the back plate 20, that is, as shown in FIG. 6, the pixel layer 22 is located between the optical sensing layer 21 and the back plate 20. It is to be noted that in a case that the optical sensing layer is located on the surface of the pixel layer facing away from the back plate, In one embodiment, the optical sensing layer is made of a photoelectric material with high transmittance, such that less influence is caused on light emitted from the pixel layer.

In the embodiment, the pixel layer includes: an electron injection layer, an electron transport layer, an organic light emitting layer, a hole transport layer and a hole injection layer successively stacked in a direction away from the back plate; or an electron injection layer, an electron transport layer, an organic light emitting layer, a hole transport layer and a hole injection layer successively stacked in a direction from the optical sensing layer toward the back plate. The structure may be determined according to a normal chip assembly process or a flip chip assembly process of an OLED device. In the embodiment, the structure is not limited.

In addition, it is to be noted that, in the embodiment, the optical information is not limited. In one embodiment, the optical information may be an intensity of light, a brightness of light and the like, which can reflect whether the OLED illuminates normally. The function of the optical sensor in the embodiment depends on the optical information, and the optical sensor is a light intensity sensor or a brightness sensor. The optical sensing layer is made of a photoelectric material that is sensitive to light and is capable of converting an optical signal into an electrical signal.

Figure 7:
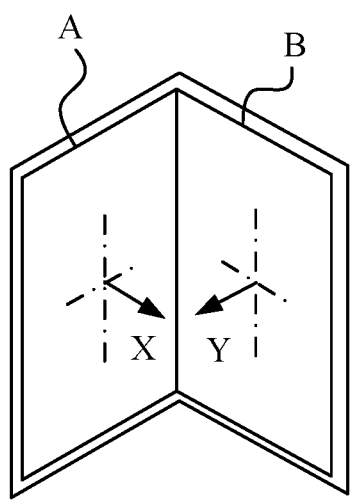
FIG. 7 is a schematic structural diagram of a foldable display panel according to an embodiment of the present disclosure.

It is to be noted that, in the embodiment, the image compensation method for a foldable display panel is performed when the first display panel and the second display panel are in the folded state. The folded state indicates that a display side of the first display panel and a display side of the second display panel are arranged facing each other, that is, each of the sub-pixels on the first display panel is arranged opposite to a corresponding sub-pixel on the second display panel. As shown in FIG. 7, which is a schematic structural diagram of the foldable display panel, a direction perpendicular to the surface of the first display panel A and along a display direction of the first display panel A is taken as a first direction X, and a direction perpendicular to the second display panel B and along a display direction of the second display panel B is taken as a second direction Y. In a case that the first display panel and the second display panel are in the folded state, the first direction and the second direction are opposite to each other.

In a case that the folded state detecting element detects that the first display panel and the second display panel are in a non-folded state, the multiple sub-pixels on the first display panel and the multiple sub-pixels on the second display panel are all used for displaying. That is, in a case that the first direction has an angle with the second direction, where the angle ranges from 0° to 180°, including 0° but not including 180°, the foldable display panel is in the non-folded state. That is, as long as the first display panel and the second display panel are not exactly opposite to each other, the foldable display panel is in the non-folded state.

In order to determine whether the first display panel and the second display panel are in the folded state, a folded state detecting element is further provided in the embodiment. It is to be noted that the structure and the form of the folded state detecting element are not limited in the embodiment. The folded state may be detected with a self-capacitance detection method, or with a mutual-capacitance detection method, or may be directly detected by a sensor.

Figure 8:
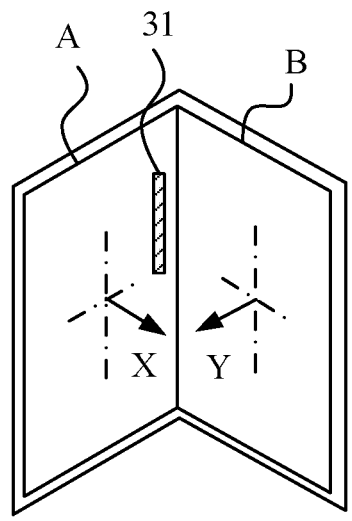
FIG. 8 is a schematic diagram illustrating distribution of a self-capacitance folded state detecting element according to an embodiment of the present disclosure.

In one embodiment, in an embodiment of the present disclosure, the folded state is detected with a self-capacitance detection method, as shown in FIG. 8, which is a schematic diagram illustrating distribution of a self-capacitance folded state detecting element according to an embodiment of the present disclosure. The folded state detecting element includes a first folded state detecting electrode 31, which is a self-capacitance detecting electrode. The first folded state detecting electrode 31 is located on the display side of the first display panel A or the display side of the second display panel B. The position of the first folded state detecting electrode 31 on the first display panel A or the second display panel B is not limited in the embodiment. In one embodiment, the first folded state detecting electrode 31 is arranged at a position on the first display panel A or the second display panel B close to the joining edge.

In another embodiment of the present disclosure, the folded state detecting element includes a first folded state detector and a second folded state detector. The first folded state detector is arranged on the first display panel, and the second folded state detector is arranged on the second display panel. The first folded state detector is symmetrical to the second folded state detector with respect to the joining edge.

Figure 9:
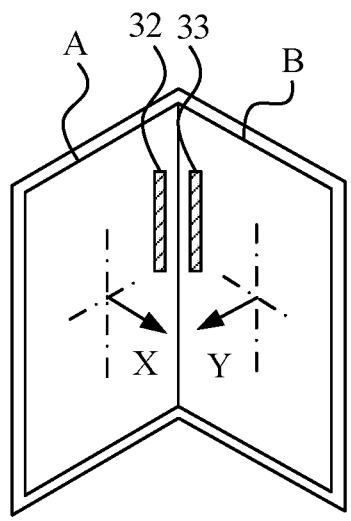
FIG. 9 is a schematic diagram illustrating distribution of a mutual-capacitance folded state detecting element according to an embodiment of the present disclosure.

The forms of the first folded state detector and the second folded state detector are not limited in the embodiment. In one embodiment, as shown in FIG. 9, which is a schematic diagram illustrating distribution of a mutual-capacitance folded state detecting element according to an embodiment of the present disclosure, the first folded state detector is a second folded state detecting electrode 32, the second folded state detector is a third folded state detecting electrode 33. The second folded state detecting electrode 32 and the third folded state detecting electrode 33 form a mutual-capacitance detecting electrode. That is, the folded state is detected with a mutual-capacitance detecting method.

It is to be noted that the first folded state detecting electrode 31, the second folded state detecting electrode 32 and the third folded state detecting electrode 33 may be arranged in a display region on the first display panel or the second display panel, or may be arranged in a non-display region, which is not limited in the embodiment. In one embodiment, the first folded state detecting electrode 31, the second folded state detecting electrode 32 and the third folded state detecting electrode 33 are formed in the display region of the display panel simultaneously with other electrodes in the display panel in one process, thereby simplifying the manufacturing process of the folded state detecting electrode.

Figure 10:
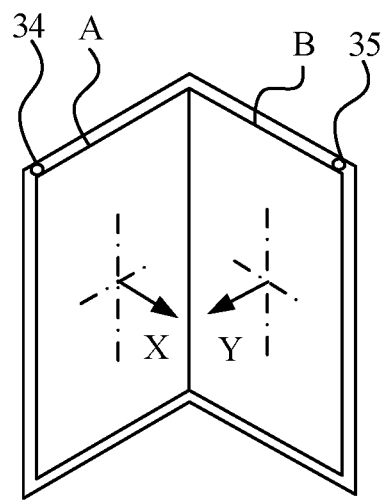
FIG. 10 is a schematic diagram illustrating distribution of a folded state detecting element according to another embodiment of the present disclosure.

In one embodiment, as shown in FIG. 10, which is a schematic diagram illustrating distribution of a folded state detecting element according to another embodiment of the present disclosure, the first folded state detector is a first distance sensor 34, and the second folded state detector is a second distance sensor 35. That is, the folded state is detected by sensors. In one embodiment, in the embodiment, both the first distance sensor 34 and the second distance sensor 35 are optical distance sensors, infrared distance sensors or ultrasonic distance sensors. It is determined whether the first display panel and the second display panel are in the folded state by detecting a distance between the first display panel and the second display panel. It is to be noted that, in order to obtain accurate detection results of the first distance sensor 34 and the second distance sensor 35, in the embodiment, the first distance sensor 34 and the second distance sensor 35 are respectively arranged on outer corners of the first display panel A and the second display panel B, such that a distance between the first sensor 34 and the second sensor 35 in a case that the foldable display panel is in the folded state is greatly different from the distance between the first distance sensor 34 and the second distance sensor 35 in a case that the foldable display panel is in the non-folded state, thereby determining the distance between the first sensor 34 and the second sensor 35 more accurately.

The foldable display panel according to the present disclosure includes a first display panel and a second display panel. One of the first display panel and the second display panel is foldable toward the other one along a joining edge. Each of sub-pixels on the two display panels has an optical information detecting function. In a case that the folded state detecting element detects that the first display panel and the second display panel are in the folded state, each of the sub-pixels on one display panel detects optical information of a corresponding sub-pixel on the other display panel, to obtain optical information of the sub-pixel, so as to perform optical compensation on the sub-pixel. Since optical information detection and image compensation are performed in a case that the foldable display panel according to the present disclosure is in the folded state, the use of the display panel is not affected. In addition, the optical image compensation may be performed for multiple times during the use of the foldable display panel according to the present disclosure after the foldable display panel leaves the factory, and the optical image compensation is performed in a real-time manner, such that the quality of a screen displayed on the foldable display panel can be ensured. Since the optical image compensation may be performed for multiple times, and the image compensation may be performed on some of the sub-pixels on the display panel in different time periods, the amount of compensation data can be reduced, thus reducing the amount of data to be processed and prolonging a service life of hardware in the display panel.

It is to be noted that since the optical information is detected in a case that the foldable display panel according to the present disclosure is in the folded state, the influence of external illumination on the accuracy of optical information detection is avoided, thereby improving the accuracy of optical information detection, thus a good compensation effect can be obtained.

Figure 11:
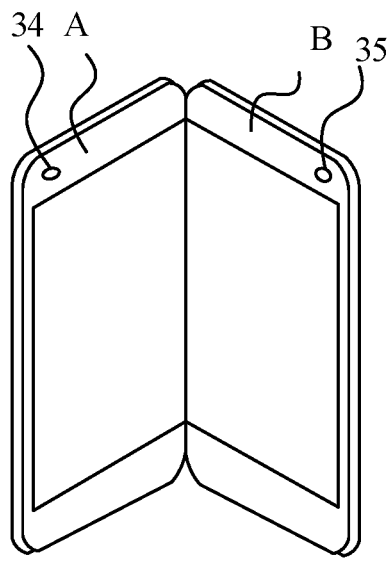
FIG. 11 is a schematic structural diagram of a foldable display device according to an embodiment of the present disclosure.

As shown in FIG. 11, which is a schematic structural diagram of a foldable display device according to an embodiment of the present disclosure, the foldable display device includes the foldable display panel described in the above embodiment.

The form of the foldable display device is not limited in the embodiment, and the foldable display device may be a mobile phone, a tablet computer or other display devices.

In the foldable display device according to the present disclosure, the foldable display panel described in the above embodiment is used, such that the foldable display device has a function of real-time image compensation, thereby ensuring the image quality of the foldable display panel.

Figure 12:
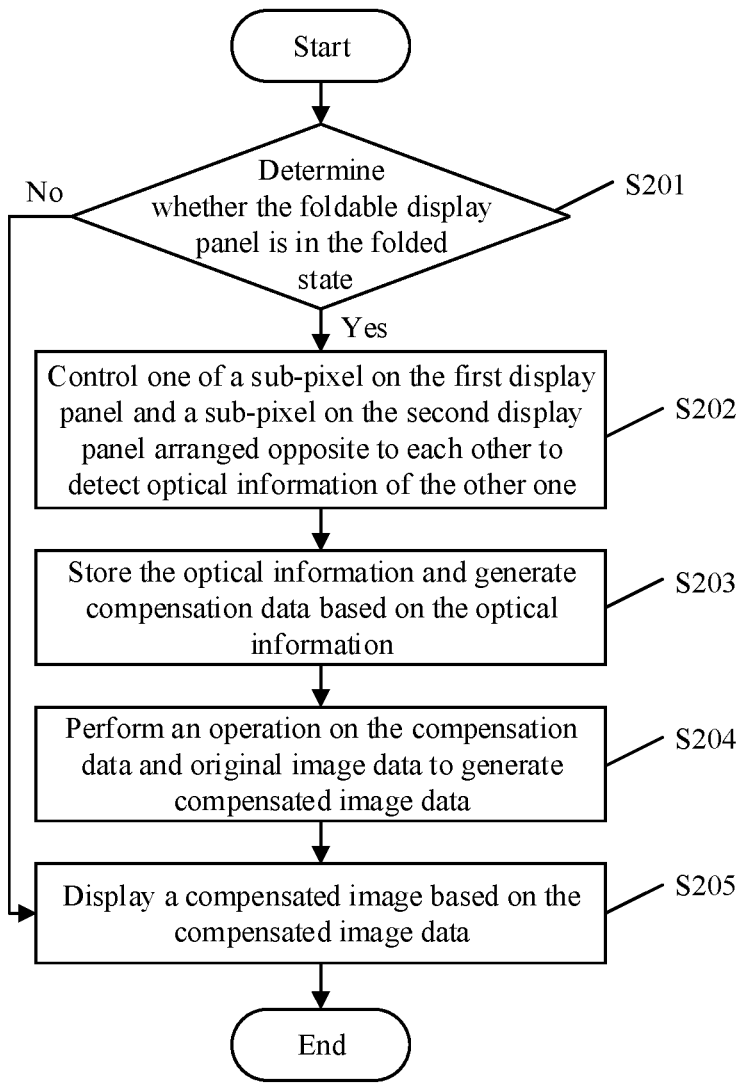
FIG. 12 is a flowchart of an image compensation method for a foldable display panel according to an embodiment of the present disclosure.

An image compensation method for a foldable display panel is further provided according to an embodiment of the present disclosure. The image compensation method is performed based on the foldable display panel described in the above embodiment. As shown in FIG. 12, which is a flowchart of an image compensation method for a foldable display panel according to an embodiment of the present disclosure, the image compensation method for a foldable display panel includes the following steps S202 to S205.

In step S202, in a case that the first display panel and the second display panel are in the folded state, one of a sub-pixel on the first display panel and a sub-pixel on the second display panel which are arranged opposite to each other is controlled to detect optical information of the other one.

In step S203, the optical information is stored and compensation data is generated based on the optical information.

In step S204, an operation is performed on the compensation data and original image data to generate compensated image data.

In step S205, a compensated image is displayed based on the compensated image data.

It is to be noted that, in the embodiment, in a case that the first display panel and the second display panel are in the non-folded state, the sub-pixels on the first display panel and the sub-pixels on the second display panel are all controlled to display.

That is, before the image is compensated, the method further includes step S201 of: determining whether the foldable display panel is in a folded state. In a case that the first display panel and the second display panel are in the folded state, the foldable display panel is operated in an image compensation mode, to perform optical information detection. In a case that the first display panel and the second display panel are in the non-folded state, the foldable display panel is operated in a display mode to display an image based on data of the previous image compensation.

In the embodiment, there are many methods for controlling one of a sub-pixel on the first display panel and a sub-pixel on the second display panel which are arranged opposite to each other to detect optical information of the other one, which are not limited in this embodiment.

Figure 13:
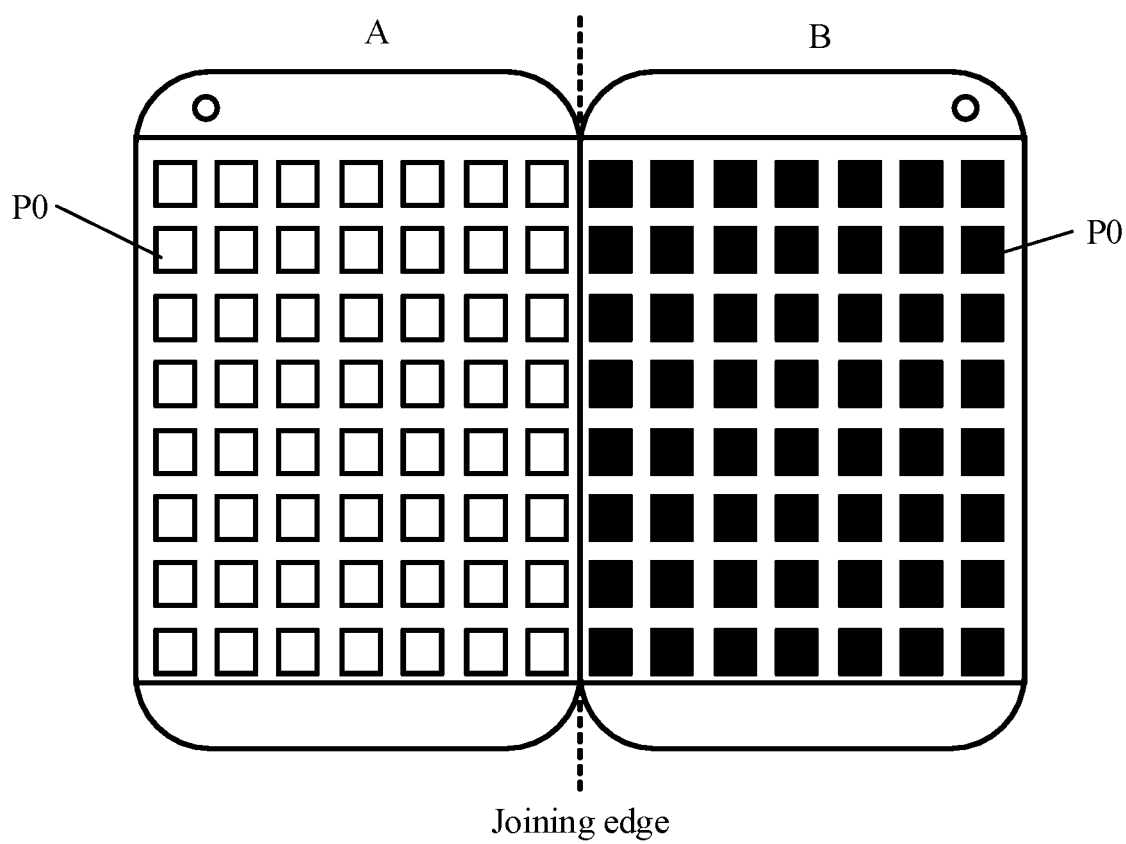
FIG. 13 is a schematic diagram of an image compensation method for a foldable display panel according to an embodiment of the present disclosure.

In one embodiment, in an embodiment of the present disclosure, as shown in FIG. 13, which is a schematic diagram of an image compensation method for a foldable display panel according to an embodiment of the present disclosure, all of sub-pixels POs on the first display panel A are controlled to be lighted, and each of sub-pixels POs on the second display panel B is controlled to detect optical information of a corresponding sub-pixel on the first display panel.

That is, in a case that the first display panel and the second display panel are in the folded state, the sub-pixels on the first display panel have a one-to-one correspondence with the sub-pixels on the second display panel and are symmetrical to the sub-pixels on the second display panel with respect to the joining edge. In this case, all the sub-pixels on the first display panel are lighted, and each of the sub-pixels on the second display panel are used for detecting optical information of a corresponding sub-pixel on the first display panel. The optical information detection method has the advantages of a high optical detection efficiency and a high image compensation efficiency, and optical information of all the sub-pixels on the first display panel can be detected at one time in a case that the first display panel and the second display panel are in the folded state, and then image compensation is performed on the sub-pixels on the first display panel. Then, all the sub-pixels on the second display panel are controlled to be lighted, and each of the sub-pixels on the first display panel is controlled to detect optical information of a corresponding sub-pixel on the second display panel, thereby performing the image compensation for the entire foldable display panel.

Figure 14:
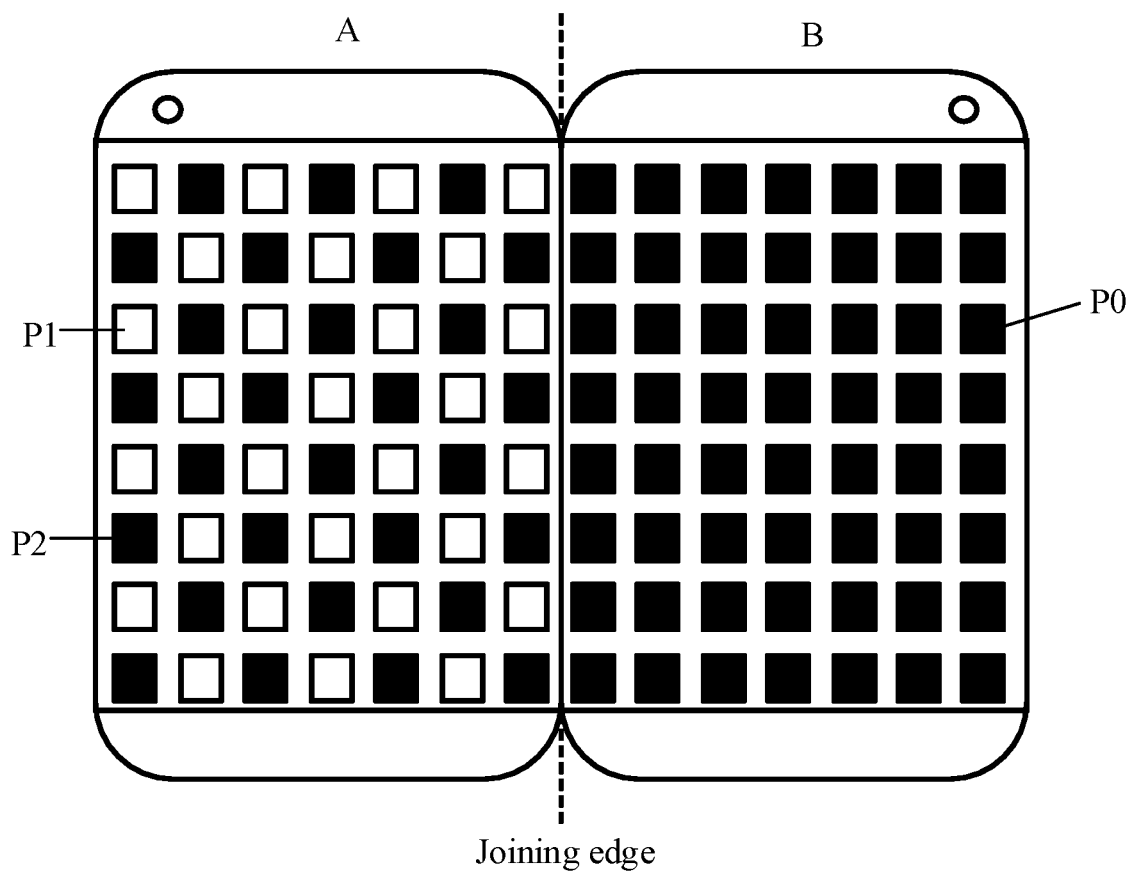
FIG. 14 is a schematic diagram of an image compensation method for a foldable display panel according to another embodiment of the present disclosure.

In another embodiment of the present disclosure, as shown in FIG. 14, which is a schematic diagram of an image compensation method for a foldable display panel according to another embodiment of the present disclosure, first sub-pixels P1s on the first display panel A are controlled to be lighted, second sub-pixels P2s on the first display panel A are controlled so as not to be lighted, where the first sub-pixels P1s and the second sub-pixels P2s are alternately arranged in both a row direction and a column direction. Each of the sub-pixels P0s on the second display panel B is controlled to detect optical information of a corresponding sub-pixel on the display panel A.

In this method, since the first sub-pixels and the second sub-pixels are alternately arranged in both the row direction and the column direction, a first sub-pixel is arranged adjacent to second sub-pixels in both the row direction and the column direction, and the first sub-pixel is lighted, the second sub-pixels are not lighted. That is, in a case that a sub-pixel on the second display panel corresponding to the lighted first sub-pixel performs optical detection on the first sub-pixel, the second sub-pixels around the first sub-pixel are not lighted, such that a brightness or a light intensity of the first sub-pixel is not affected by light emitted by the second sub-pixels, thus the optical information of the first sub-pixel is detected more accurately.

Similarly, in a case that the optical information of the second sub-pixel on the first display panel is detected, since the first sub-pixel is not lighted, and each of the second sub-pixels is arranged adjacent to first sub-pixels in both the row direction and the column direction, such that the optical information such as the brightness or the light intensity of the second sub-pixel is not affected by the unlighted first sub-pixels, thus the optical information such as the brightness or the light intensity of the second sub-pixel is detected more accurately.

It is to be noted that, in the embodiment, in a case that the second sub-pixel on the first display panel is not lighted, a sub-pixel on the second display panel corresponding to the second sub-pixel may detect optical information of the second sub-pixel, or may not detect optical information of the second sub-pixel. This is not limited in the embodiment. In one embodiment, in the embodiment, each of the sub-pixels on the second display panel detects optical information of a corresponding sub-pixel on the first display panel, thereby simplifying the control on the sub-pixels on the display panel.

With the above method, in order to detect optical information of all the sub-pixels on the foldable display panel, optical information is detected for at least four times, which includes detecting optical information of the first sub-pixels on the first display panel, detecting optical information of the second sub-pixels on the first display panel, detecting optical information of sub-pixels corresponding to the first sub-pixels on the second display panel, and detecting optical information of sub-pixels corresponding to the second sub-pixels on the second display panel. It is apparent that the efficiency is relatively low. However, since the number of sub-pixels of which the optical information is detected at each time is small, less data is stored.

Figure 15:
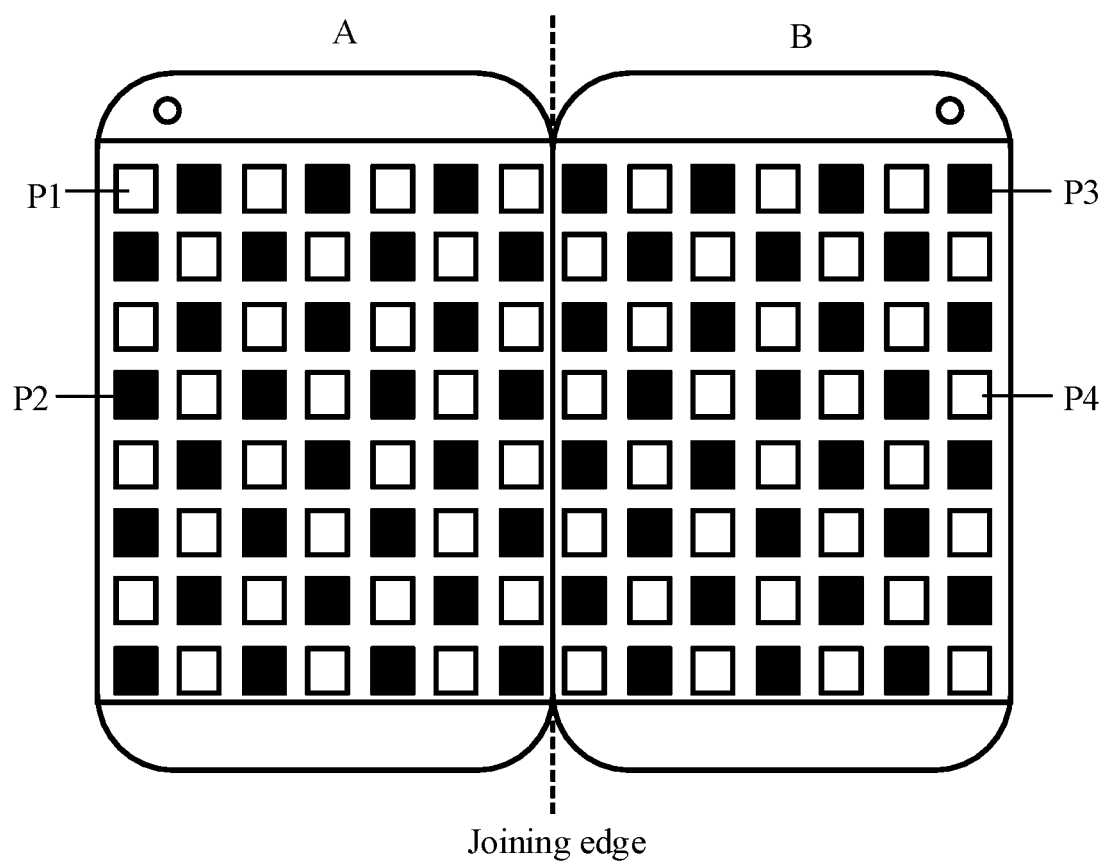
FIG. 15 is a schematic diagram of an image compensation method for a foldable display panel according to another embodiment of the present disclosure.

Based on this, an optical information detection method is further provided according to another embodiment of the present disclosure. Referring to FIG. 15, which is a schematic diagram of an image compensation method for a foldable display panel according to another embodiment of the present disclosure, the first sub-pixels P1$s$ on the first display panel A are controlled to be lighted, the second sub-pixels P2$s$ on the first display panel A are used for detecting optical information, where the first sub-pixels P1$s$ and the second sub-pixels P2$s$ are alternately arranged in both the row direction and the column direction. Each of the third sub-pixels P3$s$ on the second display panel B corresponding to a first sub-pixel P1 is controlled to detect optical information of the first sub-pixel P1, and each of the fourth sub-pixels P4$s$ corresponding to a second sub-pixel P2 is controlled to be lighted.

In the embodiment, in a case that the first sub-pixel P1 on the first display panel A is lighted, a corresponding sub-pixel on the second display panel B, that is, the third sub-pixel P3, detects optical information of the first sub-pixel P1. Meanwhile, a sub-pixel on the second display panel B corresponding to the second sub-pixel P2 on the first display panel A, that is, the fourth sub-pixel P4, is lighted and does not perform optical information detection, and the second sub-pixels P2$s$ on the first display panel A are used for detecting optical information of the fourth sub-pixels P4$s$ on the second display panel. After the optical information of the first sub-pixel and the fourth sub-pixel is detected, optical information of the second sub-pixel and the third sub-pixel is detected.

That is, at a same time instant, there are lighted sub-pixels and sub-pixels for detecting optical information on each of the first display panel and the second display panel, and the lighted sub-pixels and sub-pixels for detecting optical information are arranged alternately in both the row direction and the column direction on the display panel. On one hand, in order to detect optical information of all the sub-pixels on the entire foldable display panel, it is only required to simultaneously detect optical information of the first sub-pixels and the fourth sub-pixels at one time, and simultaneously detect optical information of the second sub-pixels and the third sub-pixels at one time, such that the optical detection efficiency is relatively improved. On the other hand, since the second sub-pixels are not lighted when the third sub-pixels detects the optical information of the first sub-pixels, the light emitted by the first sub-pixels is not affected by the second sub-pixels. In addition, although the fourth sub-pixels corresponding to the second sub-pixels are lighted, light emitted by the fourth sub-pixels is in a direction away from the second display panel, and has little influence on the third sub-pixels in detecting the optical information of the first sub-pixels. Therefore, the accuracy of optical information detection can also be improved.

Figure 16:
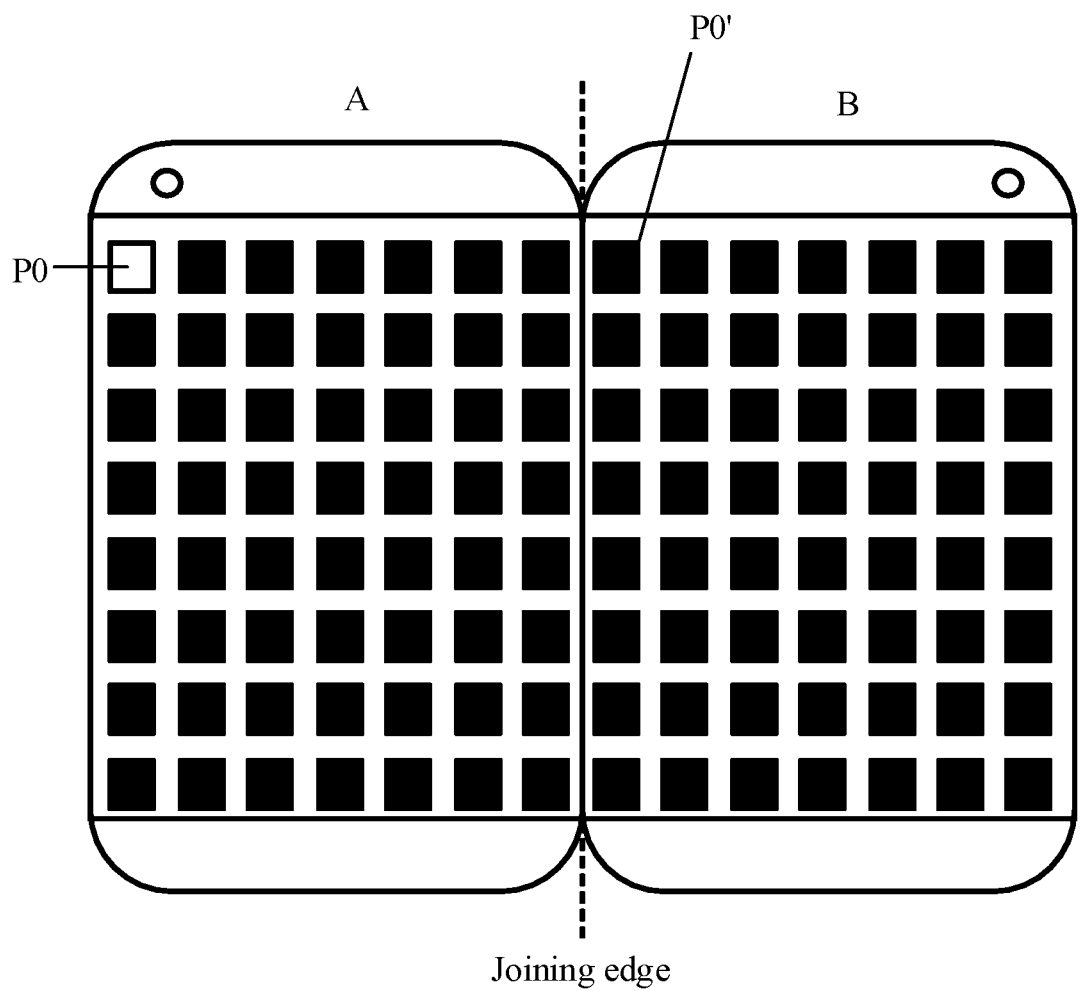
FIG. 16 is a schematic diagram of an image compensation method for a foldable display panel according to another embodiment of the present disclosure.

In addition, in order to further improve the accuracy of the optical information detection, another embodiment of the present disclosure may be as shown in FIG. 16, which is a schematic diagram of an image compensation method for a foldable display panel according to an embodiment of the present disclosure. The sub-pixels P0$s$ on the display panel A are controlled to be successively lighted, and a sub-pixel P0' on the second display panel B corresponding to the lighted sub-pixel P0 on the first display panel is controlled to detect optical information of the sub-pixel P0. That is, all the sub-pixels on the foldable display panel are lighted successively, and the optical information of the sub-pixels on the foldable display panel is successively detected, thereby avoiding the influence caused by other sub-pixels on the accuracy of the optical information detection. Compared with other optical detection methods, the optical detection method according to the embodiment has the highest accuracy, while the efficiency is relatively low.

In one embodiment, the optical detection method may be selected based on a requirement on the quality of an image on the display panel or the display device that are actually used, which is not limited in this embodiment.

With the image compensation method according to the embodiment of the present disclosure, compensation can be performed on the OLED display panel in a real-time manner after the OLED display panel leaves the factory, and the image compensation is performed only in a case that the foldable display panel is in the folded state, instead of in the non-folded state, such that normal use of the display panel is not affected. In addition, the image compensation is performed in a case that the foldable display panel is in the folded state, an interference of external light to the optical information detection can be avoided, such that the optical information is detected more accurately, and a good compensation effect can be obtained.

In addition, in the embodiment of the present disclosure, the image compensation may be performed as long as the display panel is in the folded state, and a local compensation may be performed under control in each image compensation, thereby reducing the amount of the image data to be processed, and reducing the required storage space compared with the conventional technology.

Figure 17:
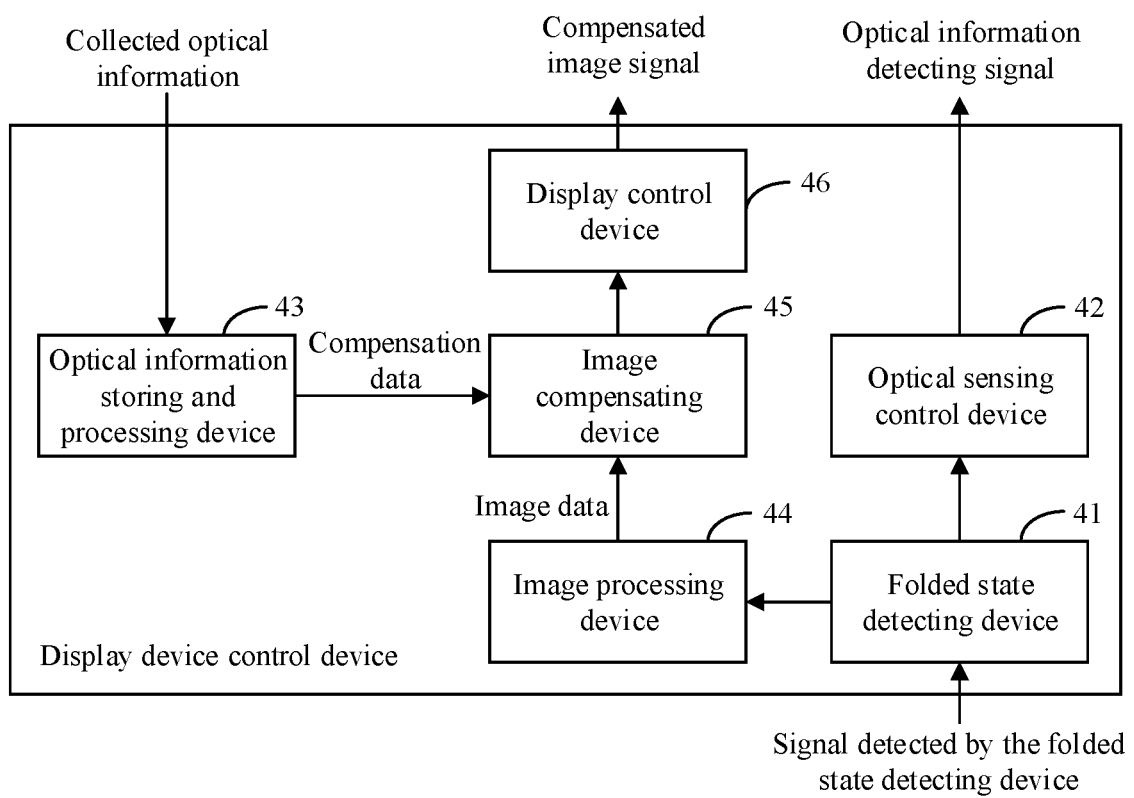
FIG. 17 is a block diagram of an image compensation device for a foldable display panel according to an embodiment of the present disclosure.

An image compensation device for a foldable display panel is further provided according to an embodiment of the present disclosure. As shown in FIG. 17, which is a block diagram of an image compensation device for a foldable display panel according to an embodiment of the present disclosure, the image compensation device includes a folded state detecting device 41, an optical sensing control device 42, an optical information storing and processing device 43, an image processing device 44, an image compensating device 45 and a display control device 46.

The folded state detecting device 41 is configured to detect whether the foldable display panel is in the folded state.

The optical sensing control device 42 is configured to control a sub-pixel to detect optical information in a case that the first display panel and the second display panel are in the folded state.

The optical information storing and processing device 43 is configured to store the optical information and generate compensation data based on the optical information.

The image processing device 44 is configured to acquire original image data.

The image compensating device 45 is configured to perform an operation on the compensation data and the original image data to generate compensated image data.

The display control device 46 is configured to display a compensated image based on the compensated image data.

For an operating principle of the image compensation device, reference may be made to the flowchart of the image compensation method shown in FIG. 12. First, the folded state detecting device 41 detects whether the foldable display panel is in the folded state. In a case that the foldable display panel is in the folded state, the foldable display panel operates in an image compensation mode. In a case that the foldable display panel is in a non-folded state, the foldable display panel operates in an image display mode.

In a case that the foldable display panel is in the folded state, the optical sensing control device 42 controls the optical sensor or the optical sensing layer in each of the sub-pixels on the first display panel or the second display panel to detect optical information of a corresponding sub-pixel, to acquire the optical information of the sub-pixel.

The optical information storing and processing device 43 generates the compensation data based on the optical information. The image compensation device 45 performs the operation on original image data transmitted by the image processing device 44 and the compensation data, to obtain the compensated image data, and transmits the compensated image data to the display control device 46. The display control device 46 controls the sub-pixels to display a compensated image.

It is to be noted that if the optical information detection is not required, the image is displayed based on previous compensation data.

The supporting hardware of the image compensation device is not limited in the embodiment. As shown in FIG. 17, multiple devices may be arranged in the display device control device of the foldable display panel, and are implemented by a display device control device of the display panel. In this embodiment, the display device control device may be a CPU (Central Processing Device) of the display device.

Figure 18:
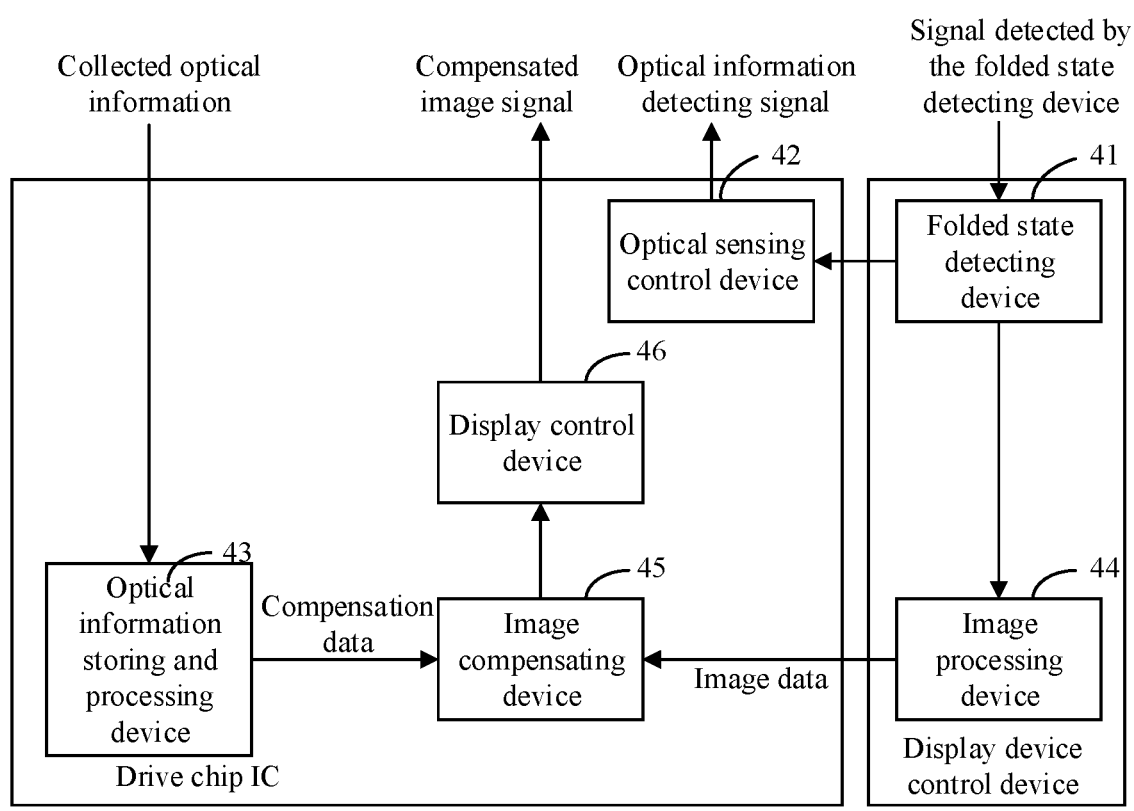
FIG. 18 is a block diagram of an image compensation device for a foldable display panel according to another embodiment of the present disclosure.

In one embodiment, as shown in FIG. 18, the folded state detecting device 41 and the image processing device 44 are integrated in the display device control device of the foldable display panel. The optical sensing control device 42, the optical information storing and processing device 43, the image compensating device 45 and the display control device 46 are integrated in the drive chip IC.

The image compensation device for a foldable display panel according to the embodiment of the present disclosure is configured to perform the image compensation method in the above embodiment. Therefore, the optical image compensation may be performed for multiple times during the use of the display panel after the display panel leaves the factory, and the optical image compensation is performed in a real-time manner, such that the quality of a screen displayed by the foldable display panel can be ensured.

It should be noted that, in the present specification, the embodiments are described in progressive manner. Each embodiment mainly focuses on an aspect difference from other embodiments, and reference can be made to these similar parts among the embodiments.

It should be further noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that articles or devices that include a series of elements include not only those elements but also those that are not explicitly listed or other elements that are inherent to such articles or devices. Unless expressively limited, the statement "including a . . . " does not exclude the case that other similar elements may exist in the article or the device other than enumerated elements.

The invention claimed is:

1. A foldable display panel, comprising:
   a first display panel and a second display panel, wherein the first display panel and the second display panel are joined at a joining edge, one of the first display panel and the second display panel is foldable toward the other one along the joining edge, the first display panel and the second display panel each comprises a plurality of sub-pixels arranged in a matrix, each of the plurality of sub-pixels on the first display panel and the plurality of sub-pixels on the second display panel has a display function and an optical information detecting function, and the plurality of sub-pixels on the first display panel are symmetrical to the plurality of sub-pixels on the second display panel with respect to the joining edge; and
   a folded state detecting element located on at least one of the first display panel and the second display panel, wherein
   in a case of the folded state detecting element detecting that the first display panel and the second display panel are in a folded state, a display side of the first display panel is located facing a display side of the second display panel, one of a sub-pixel on the first display panel and a sub-pixel on the second display panel which are arranged opposite to each other is configured to detect optical information of the other one, and the display function of the sub-pixel is disabled when the sub-pixel detects optical information, and
   in a case of the folded state detecting element detects that the first display panel and the second display panel are in a non-folded state, the plurality of sub-pixels on the first display panel and the plurality of sub-pixels on the second display panel are used for displaying.

2. The foldable display panel according to claim 1, wherein each of the plurality of sub-pixels on the first display panel and the plurality of sub-pixels on the second display panel having the display function and the optical information detecting function comprises:
   a display sub-pixel and an optical sensor arranged side by side in a plane of the first display panel or the second display panel.

3. The foldable display panel according to claim 1, wherein each of the plurality of sub-pixels on the first display panel and the plurality of sub-pixels on the second display panel having the display function and the optical information detecting function comprises: a back plate, and an optical sensing layer and a pixel layer stacked on the back plate, and wherein
- the optical sensing layer is located between the pixel layer and the back plate, or
- the pixel layer is located between the optical sensing layer and the back plate.

4. The foldable display panel according to claim 1, wherein the folded state detecting element comprises a first folded state detecting electrode which is a self-capacitance detecting electrode, and the first folded state detecting electrode is located on the display side of the first display panel or the display side of the second display panel.

5. The foldable display panel according to claim 1, wherein the folded state detecting element comprises a first folded state detector and a second folded state detector,
- the first folded state detector is arranged on the first display panel,
- the second folded state detector is arranged on the second display panel, and
- the first folded state detector is symmetrical to the second folded state detector with respect to the joining edge.

6. The foldable display panel according to claim 5, wherein the first folded state detector is a second folded state detecting electrode, the second folded state detector is a third folded state detecting electrode, and the second folded state detecting electrode and the third folded state detecting electrode form a mutual-capacitance detecting electrode.

7. The foldable display panel according to claim 5, wherein the first folded state detector is a first distance sensor, and the second folded state detector is a second distance sensor.

8. The foldable display panel according to claim 7, wherein both the first distance sensor and the second distance sensor are optical distance sensors, infrared distance sensors or ultrasonic distance sensors.

9. The foldable display panel according to claim 1, wherein the optical information is brightness.

10. A foldable display device, comprising the foldable display panel according to claim 1.

11. An image compensation method for a foldable display panel, wherein the image compensation method is based on the foldable display panel according to claim 1, and comprises:
- controlling one of a sub-pixel on the first display panel and a sub-pixel on the second display panel arranged opposite to each other to detect optical information of the other one, in a case that the first display panel and the second display panel are in the folded state;
- storing the optical information and generating compensation data based on the optical information;
- performing an operation on the compensation data and original image data to generate compensated image data; and
- displaying a compensated image based on the compensated image data.

12. The image compensation method for a foldable display panel according to claim 11, further comprising:
- controlling the plurality of sub-pixels on the first display panel and the plurality of sub-pixels on the second display panel to display, in a case that the first display panel and the second display panel are in a non-folded state.

13. The image compensation method for a foldable display panel according to claim 11, wherein the controlling one of the sub-pixel on the first display panel and the sub-pixel on the second display panel arranged opposite to each other to detect optical information of the other one, in a case the first display panel and the second display panel are in the folded state comprises:
- controlling the sub-pixels on the first display panel to be lighted; and
- controlling each of the sub-pixels on the second display panel to detect optical information of a corresponding sub-pixel on the first display panel.

14. The image compensation method for a foldable display panel according to claim 11, wherein the controlling one of the sub-pixel on the first display panel and the sub-pixel on the second display panel arranged opposite to each other to detect optical information of the other one, in a case that the first display panel and the second display panel are in the folded state comprises:
- controlling first sub-pixels on the first display panel to be lighted, and second sub-pixels on the first display panel not to be lighted, wherein the first sub-pixels and the second sub-pixels are alternately arranged in both a row direction and a column direction; and
- controlling each of the sub-pixels on the second display panel to detect optical information of a corresponding sub-pixel on the first display panel.

15. The image compensation method for a foldable display panel according to claim 11, wherein the controlling one of the sub-pixel on the first display panel and the sub-pixel on the second display panel arranged opposite to each other to detect optical information of the other one, in a case that the first display panel and the second display panel are in the folded state comprises:
- controlling first sub-pixels on the first display panel to be lighted, and second sub-pixels on the first display panel to detect optical information, wherein the first sub-pixels and the second sub-pixels are alternately arranged in both a row direction and a column direction; and
- controlling third sub-pixels on the second display panel respectively corresponding to the first sub-pixels to detect optical information of the first sub-pixels, and fourth sub-pixels on the second display panel respectively corresponding to the second sub-pixels to be lighted.

16. The image compensation method for a foldable display panel according to claim 11, wherein the controlling one of the sub-pixel on the first display panel and the sub-pixel on the second display panel arranged opposite to each other to detect optical information of the other one, in a case that the first display panel and the second display panel are in the folded state comprises:
- controlling the plurality of sub-pixels on the first display panel to be lighted successively; and
- controlling a sub-pixel on the second display panel corresponding to the lighted sub-pixel on the first display panel to detect optical information of the lighted sub-pixel.

17. An image compensation device for a foldable display panel, wherein the image compensation device is configured to perform the image compensation method for a foldable display panel according to claim 11, and comprises:
- a folded state detecting unit configured to detect whether the foldable display panel is in the folded state;

an optical sensing control unit configured to control a sub-pixel to detect optical information in a case that the first display panel and the second display panel are in the folded state;

an optical information storing and processing unit configured to store the optical information and generate compensation data based on the optical information;

an image processing unit configured to acquire original image data;

an image compensating unit configured to perform an operation on the compensation data and the original image data to generate compensated image data; and a display control unit configured to display a compensated image based on the compensated image data.

18. The image compensation device for a foldable display panel according to claim 17, wherein the folded state detecting unit, the optical sensing control unit, the optical information storing and processing unit, the image processing unit, the image compensating unit and the display control unit are integrated in a control unit of the foldable display panel.

19. The image compensation device for a foldable display panel according to claim 17, wherein the folded state detecting unit and the image processing unit are integrated in a control unit of the foldable display panel, and the optical sensing control unit, the optical information storing and processing unit, the image compensating unit and the display control unit are integrated in a drive chip an integrated circuit.

* * * * *